United States Patent
Liu et al.

(10) Patent No.: US 11,629,625 B1
(45) Date of Patent: Apr. 18, 2023

(54) SYSTEMS AND METHODS OF ENGINE EXHAUST AIR INJECTION BEFORE AND AFTER CATALYTIC CONVERTERS

(71) Applicant: GM GLOBAL TECHNOLOGY OPERATIONS LLC, Detroit, MI (US)

(72) Inventors: Chengke Liu, Novi, MI (US); Rafat F Hattar, Royal Oak, MI (US); John Michael Ellenberger, Huntington Woods, MI (US); Philipp A Seyfried, Rochester Hills, MI (US)

(73) Assignee: GM GLOBAL TECHNOLOGY OPERATONS LLC, Detroit, MI (US)

( * ) Notice: Subject to any disclaimer, the term of this patent is extended or adjusted under 35 U.S.C. 154(b) by 0 days.

(21) Appl. No.: 17/810,720

(22) Filed: Jul. 5, 2022

(51) Int. Cl.
| | |
|---|---|
| *F01N 3/22* | (2006.01) |
| *F01N 3/30* | (2006.01) |
| *F01N 11/00* | (2006.01) |
| *F01N 3/05* | (2006.01) |
| *F01N 3/10* | (2006.01) |

(52) U.S. Cl.
CPC ............ *F01N 3/225* (2013.01); *F01N 3/05* (2013.01); *F01N 3/30* (2013.01); *F01N 11/002* (2013.01); *F01N 3/101* (2013.01); *F01N 3/103* (2013.01); *F01N 2260/022* (2013.01); *F01N 2270/02* (2013.01); *F01N 2270/10* (2013.01); *F01N 2550/02* (2013.01); *F01N 2560/06* (2013.01); *F01N 2560/14* (2013.01); *F01N 2610/06* (2013.01); *F01N 2610/146* (2013.01); *F01N 2900/08* (2013.01); *F01N 2900/1404* (2013.01)

(58) Field of Classification Search
CPC . F01N 3/05; F01N 3/101; F01N 3/103; F01N 3/225; F01N 3/30; F01N 11/002; F01N 2260/022; F01N 2270/02; F01N 2270/10; F01N 2550/02; F01N 2560/06; F01N 2560/14; F01N 2610/06; F01N 2610/146; F01N 2900/08; F01N 2900/1404
USPC ......... 60/274, 286, 289, 290, 298, 299, 320, 60/324
See application file for complete search history.

(56) References Cited

U.S. PATENT DOCUMENTS

| | | | | |
|---|---|---|---|---|
| 4,192,141 | A | * | 3/1980 | Nonoyama ............... F01N 3/22 60/306 |
| 4,321,792 | A | * | 3/1982 | Achard ..................... F01N 3/22 60/306 |
| 11,105,241 | B2 | * | 8/2021 | Tucker .................... F01N 3/103 |

(Continued)

*Primary Examiner* — Jorge L Leon, Jr.
(74) *Attorney, Agent, or Firm* — Lorenz & Kopf LLP (57) ABSTRACT

Engine systems and methods use a dual air injection approach to control exhaust reactions and to maintain temperatures below a maximum limit of exhaust system components during engine enrichment operation conditions. Dual air injectors are disposed in the exhaust system with one upstream from, and another downstream from, the catalytic converter. Providing air injection before and/or after the converter helps convert all HC, CO, and PM emissions while keeping the catalyst temperature below the catalyst protection temperature limit. Air injection quantity may be controlled and diagnosed by monitoring the temperatures before and after the catalytic converter. The catalytic converter may be a three-way catalytic converter for lower cost or a downstream two-way catalytic converter may be added if further emission reduction is necessary.

16 Claims, 5 Drawing Sheets

(56) References Cited

U.S. PATENT DOCUMENTS

| | | | |
|---|---|---|---|
| 2014/0318112 A1* | 10/2014 | Solbrig | F01N 3/208 |
| | | | 60/324 |
| 2016/0222861 A1* | 8/2016 | Fujie | F01N 11/002 |
| 2017/0335748 A1* | 11/2017 | Zhang | F02D 41/0065 |
| 2019/0345857 A1* | 11/2019 | Rollinger | F01N 3/30 |
| 2020/0088081 A1* | 3/2020 | Rohde | F01N 3/2066 |
| 2020/0271046 A1* | 8/2020 | Kelly | F02B 37/10 |
| 2021/0054772 A1* | 2/2021 | Williams | F01N 3/222 |
| 2021/0388751 A1* | 12/2021 | Cvelbar | F01N 13/008 |

\* cited by examiner

SYSTEMS AND METHODS OF ENGINE EXHAUST AIR INJECTION BEFORE AND AFTER CATALYTIC CONVERTERS

INTRODUCTION

The present disclosure relates to engine systems and methods and to exhaust systems thereof, and more particularly relates to engine systems and methods that employ air injection into an exhaust system before and/or after catalytic converter systems to reduce hydrocarbon (HC), carbon monoxide (CO) and/or particulate matter (PM) emissions and to improve exhaust system robustness.

Internal combustion engines convert fuel and air to various compounds while extracting energy to perform intended functions, such as propelling a vehicle. The compounds generated in engines may be further converted or treated by various aftertreatment systems. A two-way catalytic converter converts HC and CO and oxides to innocuous elements or compounds. A three-way catalytic converter is designed for converting HC, CO and nitrogen oxides.

Vehicle engines are generally operated at stoichiometric conditions. Under certain situations the operation may depart from stoichiometric to accomplish certain performance attributes. In such nonstoichiometric situations, the aftertreatment systems may operate less than optimally. Characteristics of the exhaust leaving the engine is subject to numerous variables and ensuring optimal aftertreatment is challenging. The challenges are compounded by limitations in the aftertreatment systems such as temperature limits of catalysts.

Accordingly, it is desirable to provide engine systems with exhaust aftertreatment systems that enable providing optimal conversion and component protection purposes while limiting undesirable emissions, or emissions higher than regulation requirements. Furthermore, other desirable features and characteristics of the present disclosure will become apparent from the subsequent detailed description and the appended claims, taken in conjunction with the accompanying drawings and the foregoing technical field and background.

SUMMARY

Engine systems and methods use air injection before and/or after an exhaust system's catalyst, with optional mixing, to optimally convert HC, CO and/or PM to innocuous constituents, including under high exhaust mass flow conditions, while maintaining exhaust system components below maximum temperature limits. In various embodiments, an engine consumes fuel and air to generate an exhaust gas stream. An exhaust system channels the exhaust gas stream from the engine to a tailpipe for emission. A catalytic converter is included in the exhaust system and is configured with upstream and downstream air injections.

In additional embodiments, a mixer is disposed in the exhaust system downstream from the catalytic converter. The mixer defines an oxidation chamber. A mixing plate is disposed in the oxidation chamber and is configured to allow the exhaust gas stream to pass through the oxidation chamber.

In additional embodiments, a first temperature sensor is disposed in the exhaust system upstream from the catalytic converter and a second temperature sensor disposed in the exhaust system downstream from the catalytic converter. A controller is configured to control the flow through the upstream air injector, based on the first temperature sensor. The controller is configured to diagnose a conversion performance of the catalytic converter by calculating conversion heat released based on the second temperature sensor.

In additional embodiments, the upstream air injector includes a first orifice having a first flow area and the downstream air injector includes second orifice having a second flow area. A controller is configured to control flow through the air injectors including to inject air, through at least one of the air injectors, to maintain the catalytic converter below a maximum temperature limit, wherein the first flow area is smaller than the second flow area to improve mixing and accuracy of the flow through the upstream air injector and to optimize exhaust temperature reduction by the flow through the downstream air injector.

In additional embodiments, flow is controlled through the air injectors so that when a temperature of the exhaust gas stream upstream from the catalytic converter is below a threshold temperature, air is injected into the exhaust gas stream through the upstream air injector only and not through the downstream air injector.

In additional embodiments, flow is controlled through the air injectors so that when a temperature of the exhaust gas stream upstream from the catalytic converter is above a threshold temperature, air is injected into the exhaust gas stream through the downstream air injector only and not through the upstream air injector.

In additional embodiments, flow is controlled through the air injectors to: effect an air injection when an equivalence ratio of the engine is greater than one; effect, when a temperature of the exhaust gas stream upstream from the catalytic converter is below a first threshold temperature, the air injection into the exhaust gas stream through the upstream air injector only; effect, when a temperature of the exhaust gas stream upstream from the catalytic converter is above a second threshold temperature, the air injection into the exhaust gas stream through the downstream air injector only; and effect, when a temperature of the exhaust gas stream upstream from the catalytic converter is between the first threshold temperature and the second threshold temperature, the air injection into the exhaust gas stream through both the upstream air injector and the downstream air injector.

In additional embodiments, the controller is configured to control, based on an equivalence ratio of the engine when operating, air injection through the upstream air injector and the downstream air injector. The equivalence ratio indicates a fuel-to-air ratio at which the engine is operating as compared to a stoichiometric ratio for the engine. When the catalytic converter comprises a two-way catalytic converter and the equivalence ratio is greater than one, the controller is configured to control a temperature in the catalytic converter to achieve a complete carbon monoxide and hydrocarbon reaction. The catalytic converter may be a pair of underfloor catalytic converters, such as a three-way followed by a two-way, when greater emission reduction is needed, or the catalytic converter may be a single two-way or three-way catalytic converter for reduced cost.

In additional embodiments, the controller is configured to control flow through the air injectors so that when a speed at which the engine is operating is below a threshold speed, air is injected into the exhaust gas stream through the upstream air injector only and not through the downstream air injector.

In additional embodiments, the controller is configured to: control flow through the air injectors to effect an injection of air into the exhaust gas stream through the upstream air injector only, when: an equivalence ratio of the engine when operating is above 1.0; a temperature of the exhaust gas stream upstream from the catalytic converter is below a threshold temperature; and a speed at which the engine is operating is below a threshold speed.

In a number of other embodiments, a method includes configuring an engine system with an engine for consuming fuel and air to generate an exhaust gas stream. The exhaust gas stream is channeled through an exhaust system from the engine to a tailpipe for emission. A catalytic converter is provided in the exhaust system. A first air injector is disposed in the exhaust system upstream from the catalytic converter and for a first set of operating conditions of the engine, air is injected into the exhaust system upstream from the catalytic converter. A second air injector is disposed in the exhaust system downstream from the catalytic converter and for a second set of operating conditions of the engine, air is injected into the exhaust system downstream from the catalytic converter.

In additional embodiments, a mixer is disposed in the exhaust system downstream from the catalytic converter. The mixer defines an oxidation chamber with a mixing plate disposed in the oxidation chamber so that the exhaust gas stream is allowed to pass the mixing plate through the oxidation chamber.

In additional embodiments, an injection system is coupled with the first air injector and with the second air injector. A first branch pipe section leads to the first air injector and a second branch pipe section leads to the second air injector. A first mass flow controller controls flow through the first air injector, and a second mass flow controller controls flow through the second air injector.

In additional embodiments, a method includes controlling flow through the air injectors and injecting air through at least one of the air injectors to maintain the catalytic converter below a maximum temperature limit, while simultaneously raising a temperature of the exhaust gas stream downstream from the catalytic converter.

In additional embodiments, a method includes controlling flow through the air injectors and effecting, when a temperature of the exhaust gas stream upstream from the catalytic converter is below a threshold temperature, an injection of air into the exhaust gas stream through the upstream air injector only.

In additional embodiments, a method includes controlling flow through the air injectors and effecting, when a temperature of the exhaust gas stream upstream from the catalytic converter is above a threshold temperature, an injection of air into the exhaust gas stream through the downstream air injector only.

In additional embodiments, a method includes controlling flow through the air injectors to effect an air injection when an equivalence ratio of the engine is greater than one. When a temperature of the exhaust gas stream upstream from the catalytic converter is below a first threshold temperature, the air injection is effected into the exhaust gas stream through the first air injector only. When a temperature of the exhaust gas stream upstream from the catalytic converter is above a second threshold temperature, the air injection into the exhaust gas stream is effected through the second air injector only. When a temperature of the exhaust gas stream upstream from the catalytic converter is between the first threshold temperature and the second threshold temperature, the air injection into the exhaust gas stream is effected through both the upstream air injector and the downstream air injector.

In additional embodiments, a method includes controlling air injection through the upstream air injector and the downstream air injector, based on an equivalence ratio of the engine, when operating. The equivalence ratio indicates a fuel-to-air ratio at which the engine is operating as compared to a stoichiometric ratio for the engine.

In additional embodiments, a method includes controlling flow through the air injectors to effect an injection of air into the exhaust gas stream through the upstream air injector only, when an equivalence ratio of the engine operating is above 1.0, a temperature of the exhaust gas stream upstream from the catalytic converter is below a threshold temperature, and a speed at which the engine is operating is below a threshold speed.

In a number of other embodiments, an engine system includes an engine configured to consume fuel and air to generate an exhaust gas stream. An exhaust system is configured to channel the exhaust gas stream from the engine to a tailpipe for emission and includes a catalytic converter in the exhaust system. One air injector is disposed in the exhaust system upstream from the catalytic converter and is configured to inject air into the exhaust system upstream from the catalytic converter. Another air injector is disposed in the exhaust system downstream from the catalytic converter and is configured to inject air into the exhaust system downstream from the catalytic converter. One exhaust gas temperature sensor is disposed in the exhaust gas stream upstream from the catalytic converter and another exhaust gas temperature sensor is disposed in the exhaust gas stream downstream from the catalytic converter. Based on inputs of a first exhaust gas temperature from the first exhaust gas temperature sensor and of a second exhaust gas temperature from the second exhaust gas temperature sensor, a controller is configured to effect air injections: through the upstream air injector only, when the first exhaust gas temperature is below a first threshold temperature; through the downstream air injector only, when the first exhaust gas temperature is above a second threshold temperature; and through both the first and second air injectors simultaneously, when the second exhaust gas temperature is at a maximum temperature limit of the catalytic converter.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of steering systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As disclosed herein, the injection of air before and/or after a catalytic exhaust treatment device, reduces exhaust gases such as hydrocarbons and carbon monoxides including under enrichment conditions. At exhaust temperatures greater than 500 degrees Celsius, hydrocarbons and carbon monoxide may be converted in sections of exhaust pipe in addition to that converted in the catalyst via the introduction of air into the exhaust stream. The conversion may be assisted by a mixing device in some embodiments, which creates exhaust gas flow conditions to increase the air and exhaust gas mixing and reactions. In high exhaust gas mass flow and high CO conditions when exhaust gas temperatures are naturally too low downstream from the catalytic exhaust gas treatment device for conversion in the downstream pipe section, air injection may be used to dose enough oxygen upstream to induce post oxidation by increasing temperature in the catalytic exhaust gas treatment device through exothermic reactions induced by the upstream air injection.

Figure 1:
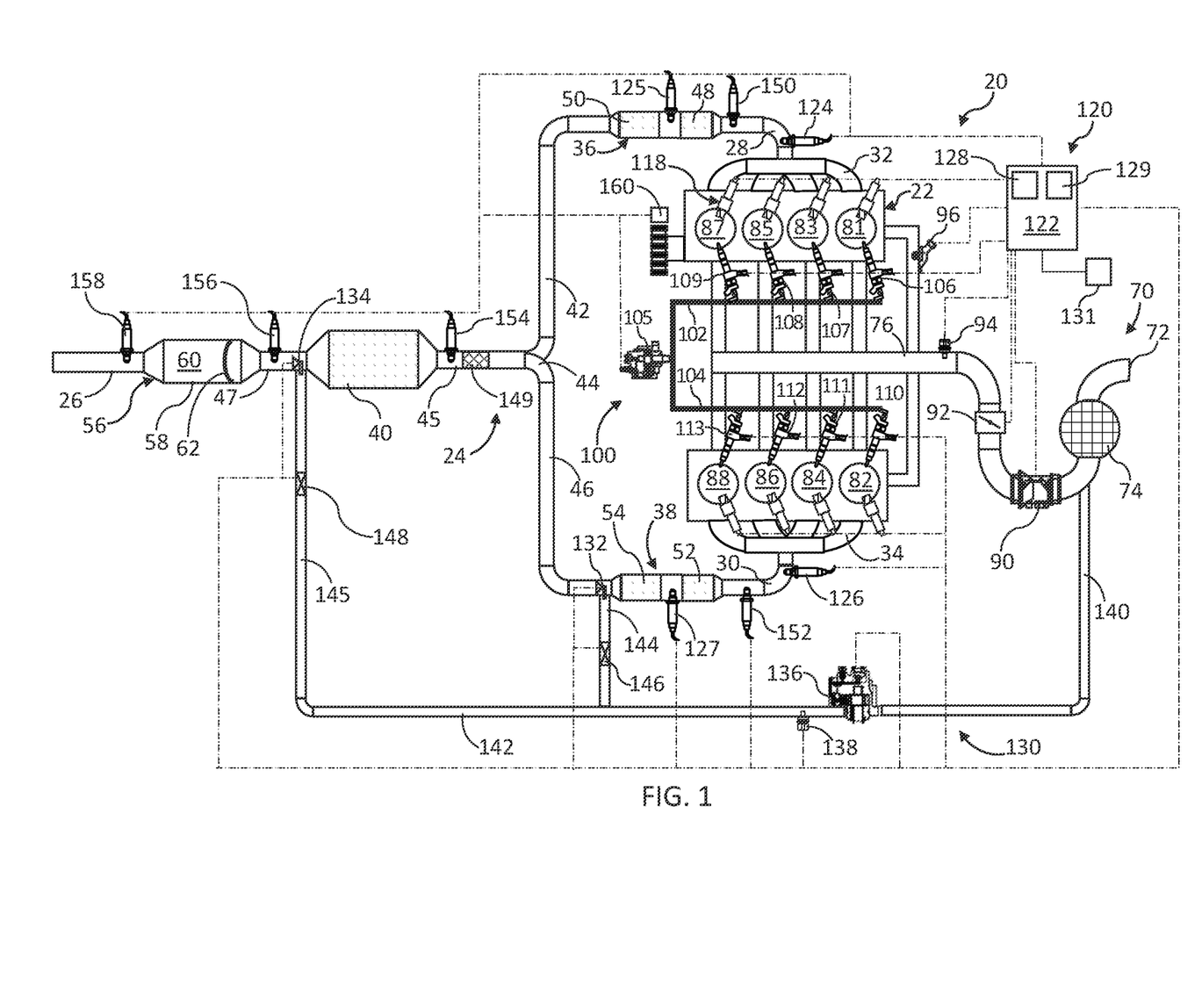
FIG. 1 is a schematic illustration of an engine system having an exhaust system with pre and post catalyst air injection and optional mixing features, in accordance with various embodiments.

Referring to FIG. 1, an engine system 20 includes an internal combustion engine 22, which in the present embodiment is an eight cylinder gasoline and air consuming engine. The engine 22 may be naturally aspirated as illustrated, or in other embodiments may include a turbocharger or supercharger to pump air into the engine for combustion purposes. The engine system 20 includes an exhaust system 24 for conveying exhaust gases from the combustion chambers of the engine 22 to a tailpipe section 26 for discharge to the atmosphere. A pair of pipe sections 28, 30 run from the engine 22, such as from its exhaust manifolds 32, 34 respectively, in a dual arrangement and each to aftertreatment devices in the form of close-coupled catalytic converters 36, 38 respectively. The close-coupled catalytic converters 36, 38 may be of the three-way type to convert CO, HC and PM at lower engine operating temperatures such as immediately following engine startup, due to their proximity to the exhaust manifolds 32, 34. An additional catalytic converter 40 is disposed downstream in an underfloor location and effects a majority of conversion during normal engine operation. The catalytic converter 40 may be two-way or three-way type. The catalytic converter 40, when configured as a two-way type, converts two components in the exhaust gas stream, including CO and HC, to other constituents. When the catalytic converter 40 is configured as a three-way type, it converts three components in the gas stream to other elements or compounds including converting CO, HC and nitrogen oxides to innocuous elements or compounds. The catalytic converter 40 may contain catalysts such as platinum, palladium or other materials. The catalysts have a maximum temperature limit to maintain their effectiveness.

In the current embodiment, the close-coupled catalytic converter 36 is disposed after the pipe section 28 with a downstream pipe section 42 running from the close-coupled catalytic converter 36 to a junction 44. The close-coupled catalytic converter 38 is disposed after the pipe section 30 with a downstream pipe section 46 running from the close-coupled catalytic converter 38 to the junction 44. The close-coupled catalytic converter 36 includes a front element 48 and a rear element 50, and the close-coupled catalytic converter 38 includes a front element 52 and a rear element 54. From the exhaust manifolds 32, 34 to the junction 44, the exhaust system 24 is a dual exhaust system and from the junction 44 to the tailpipe section 26 the exhaust system 24 is a single exhaust system.

Downstream from the junction 44, the exhaust system 24 includes a pipe section 45 leading from the conjoined pipe sections 42, 46 to the catalytic converter 40, which is followed by a pipe section 47 leading to an optional mixer 56, which is followed by the tailpipe section 26. The mixer 56 is omitted in some embodiments and is included when additional mixing/reaction of the injected air and exhaust gas is desired. The mixer 56 includes a canister 58 providing an oxidation chamber 60 and includes a mixing plate 62. The mixing plate 62 is curved and includes holes and/or gaps in the oxidation chamber 60 for the exhaust gas stream to pass through the oxidation chamber 60. The mixing plate 62 is disposed in the oxidation chamber 60 and spans across the flow path defined by the canister 58 to maximize injected air and exhaust gas flow interaction and mixing. The mixer 56 with the enlarged oxidation chamber 60 positioned downstream from the catalytic converter 40 assists in converting HC, CO, and/or PM, including at high exhaust gas mass flow and in enrichment conditions of operation of the engine 22. In some conditions, conversion is optimized by injecting air only before the catalytic converter 40 through the air injector 132. In some conditions, the conversion is optimized by injecting air only after the catalytic converter 40 through the air injector 134 supplying fresh air to the mixer 56. In some conditions, conversion is optimized by injecting air both before the catalytic converter 40 through the air injector 132 and after the catalytic converter through the air injector 134.

The engine system 20 includes an intake system 70 with an air inlet 72, an air filter 74 and an intake manifold 76. The intake manifold 76 supplies air to the cylinders 81-88 of the engine 22 as controlled by intake valves (not illustrated). The exhaust system 24 conveys, as controlled by exhaust valves (not illustrated), combusted gases from the cylinders 81-88 to atmosphere through the tailpipe section 26. Disposed in the intake system 70 downstream from the air filter 74 and upstream from the intake manifold are, in order, a mass air flow sensor 90, an intake throttle 92, and an intake manifold pressure sensor 94. The engine 22 is liquid cooled and includes a coolant temperature sensor 96 to provide data on the operating temperature of the engine. The engine system 20 is spark ignition operated and as such, includes an ignition system 118 with individual spark plugs in each of the cylinders 81-88.

The engine system 20 includes a fuel system 100 for supplying fuel to the cylinders 81-88. In the current embodiment, the engine is a gasoline-direct-injection (GDI) engine with fuel rails 102, 104 supplying fuel from a fuel supply 105 to injectors 106-113. The engine system 20 also includes a control system 120 that generally includes a controller 122 coupled with the various actuators and sensors. The controller 122 may receive various signals from the sensors and send control signals to various actuators for operation of the engine system 20 and its related systems. The sensors are devices that sense observable conditions of the engine system 20 and in the current embodiment include oxygen sensors 124-127 measuring the oxygen content of the exhaust gases leaving the engine 22 and after the close-coupled catalytic converters 36, 38 to determine the amount of remaining CO directed to the catalytic converter 40. The oxygen sensors 124-127 may be exhaust/oxygen/wide range air-fuel (WRAF) sensors. The signals from the oxygen sensors 124-127 vary according to changing oxygen levels in the exhaust and enable determining unburned oxygen in the exhaust indicative of CO content. The signals from the oxygen sensors 124, 126 may also be used to determine the fuel/air ratio at which the engine 22 is operating, from which a current fuel-to air equivalence ratio (EQR) may be computed.

The sensors of the engine system 20 include other typical engine system sensors such as the sensors 90, 94, 96 and additional sensors as descried below. The oxygen sensors 124, 126 measure parameters for determining engine out emissions, and in particular may be used to measure/determine CO content in the gas stream leaving the engine 22. In the current embodiment, the actuators may include the intake throttle 92 along with other typical engine system actuators and additional actuators as described below.

In the depicted embodiment, the controller 122 includes a processor 128 and a memory device 129, and is coupled with a storage device 131. The processor 128 performs the computation and control functions of the controller 122, and may comprise any type of processor or multiple processors, single integrated circuits such as a microprocessor, or any suitable number of integrated circuit devices and/or circuit boards working in cooperation to accomplish the functions of a processing unit. During operation, the processor 128 executes one or more programs and may use data, each of which may be accessed from the storage device 131 and as such, the processor 128 controls the general operation of the controller 122 in executing the processes described herein, such as the processes described further below in connection with FIGS. 4 and 5.

The memory device 129 may be any type of suitable memory. The memory device 129 may store the above-referenced programs along with one or more stored values of the data such as for short-term data access. The storage device 131 stores data, such as for long-term data access for use in automatically controlling the engine system 20 and its related systems including the exhaust system 24 and the air injection system 130. The storage device 131 may be any suitable type of storage apparatus. In one exemplary embodiment, the storage device 131 comprises a source from which the memory device 129 receives the programs that execute one or more embodiments of one or more processes of the present disclosure, such as the steps of the process (and any related processes thereof) described further below in connection with FIGS. 4 and 5. In another exemplary embodiment, the programs may be directly stored in and/or otherwise accessed by the memory device 129.

The programs represent executable instructions, used by the electronic controller 122 and may include one or more separate programs, each of which comprises an ordered listing of executable instructions for implementing logical functions. The instructions, when executed by the processor 128 support the receipt and processing of signals such as from the various sensors, and the performance of logic, calculations, methods and/or algorithms for automatically controlling the components and systems described herein. The processor 128 may generate control signals for the air injection system 130, and to automatically control various components and systems of the engine system 20 and the exhaust system 24, based on the logic, calculations, methods, and/or algorithms. While the components of the control system 120 are depicted as being part of the same system, it will be appreciated that in certain embodiments, these features may comprise multiple systems and any number of individual controllers may be employed.

The controller 122 commands an amount of fuel to be delivered to each cylinder 81-88 through the fuel system 100. A fuel-to-air ratio is the mass of fuel being delivered to the engine 22 over the mass of air being delivered to the engine 22. The amount of fuel commanded, generally correlates to the amount needed for stoichiometric operating conditions given the current operating state of the engine 22. Stoichiometric operation supplies the precise amount of air needed to result in complete burning of the fuel delivered to the cylinders 81-88 for converting all of the delivered fuel to carbon dioxide and water. Accordingly, a ratio of fuel-to-air that provides the right amount of air to completely burn the delivered fuel, is referred to as stoichiometric. EQR is a ratio of actual fuel-to-air used under current operating conditions of the engine 22 as compared to the projected stoichiometric fuel-to-air ratio for current conditions. Referring to a fuel-to-air EQR means that ratios greater than 1.0 indicate there is more fuel in the fuel-air mixture than required for complete combustion (stoichiometric), and ratios less than 1.0 represent a deficiency of fuel/excess air in the mixture. Accordingly, an EQR greater than 1.0 indicates a rich-of-stoichiometric operating condition (enrichment conditions).

Under certain operating conditions, the controller 122 may depart from stoichiometric operating conditions according to preprogrammed algorithms of the control system 120. For example, under heavy load conditions, excess fuel may be delivered to the cylinders 81-88 for diagnostic purposes and for component protection purposes. When excess fuel is delivered, the catalytic converter 40 may become saturated, meaning that complete conversion of the target constituents in the exhaust gas stream does not occur within the catalytic converter 40 within the applicable temperature limits. For example, all HC, CO and/or PM may not be converted as desired. Accordingly, additional air injection measures are described herein to address the HC, CO and/or PM remaining in the exhaust gas stream under non-stoichiometric and/or other conditions.

The engine system 20 includes a dual air injection system 130 in the exhaust system 24 including air injector 132 and air injector 134 each disposed to inject air into the exhaust gas stream. In this embodiment, air is extracted from the intake system 70 downstream from the air filter 74 by an air pump 136. The air is selectively injected through the air injector 132 and/or the air injector 134 as needed for the current operating conditions of the exhaust system 24 and as further described below. The air injector 132 is located immediately downstream from the close-coupled catalytic converter 38. Immediately downstream means that the air injector 132 is positioned to maximize its distance in the pipe section 46 from the catalytic converter 40. In other terms, the air injector 132 is located as close to the close-coupled catalytic converter 38 as is practical. It should be noted that there is no air injector in the pipe section 42 downstream from the close-coupled catalytic converter 36 because one air injection point upstream from the catalytic converter 40 is adequate for the dual exhaust manifold arrangement since the pipe sections 42, 46 join together at the junction 44 before the catalytic converter 40. As used herein, upstream and downstream means the relative location of something in the flow of air/gases through the engine system 20 from the air inlet 72 to the tailpipe 26. For example, the air inlet 72 is upstream from the air filter 74 and the catalytic converter 40 is downstream from the junction 44.

The dual air injection system 130 includes a pipe section 140 coupling the air pump 136 with the intake system 70 and a pipe section 142 coupling the pump with the air injectors 132, 134. A branch pipe section 144 couples the pipe section 142 with the air injector 132 and includes a check valve 146 to prevent a reverse flow out of the exhaust system 24 through the air injector 132. Another branch pipe section 145 couples the pipe section 142 with the air injector 134 and includes a check valve 148 to prevent a reverse flow out of the exhaust system 24 through the air injector 134. It should be noted that the check valves 146, 148 may be passive or active devices and may comprise a part of the actuators of the engine system 20. In addition, the air injectors 132, 134 are controlled devices configured to inject a determined amount of air as further described below and as such are a part of the actuators of the engine system 20. The air injectors 132, 134 may be nozzle type air injectors with separate mass flow control valves (described below) to precisely control the amount of flow delivered. In some embodiments, the air injectors 132, 134 may themselves be actuated variable orifice devices such as air-injection control valves to precisely control the amount of air injected. In embodiments, a relatively small orifice may be included in the air injector 132 to improve air injection accuracy and mixing, and (relative to the air injector 132), a larger nozzle orifice may be included in the air injector 134 to reduce exhaust temperatures when desired.

A pressure sensor 138 is disposed in the pipe section 142 downstream from the pump 136 and upstream from the branch pipe section 144 to monitor pressure output of the pump 136. The sensed pressure may be used to confirm output of the pump 136 when its speed is set by the control system 120, and may also be used to diagnose faults in the pump 136 when the pressure reading does not match an expected level.

A number of temperature sensors are included in the engine system 20 including the coolant temperature sensor 96. In addition, an exhaust gas temperature sensor 150 is disposed immediately upstream from the close-coupled catalytic converter 36 and an exhaust gas temperature sensor 152 is disposed immediately upstream from the close-coupled catalytic converter 38. Another exhaust gas temperature sensor 154 is disposed immediately upstream from the catalytic converter 40 between the junction 44 and the catalytic converter 40 and in the pipe section 45. Another exhaust gas temperature sensor 156 is disposed immediately upstream from the mixer 56 and downstream from the air injector 134 and downstream from the catalytic converter 40 and in the pipe section 47. Another exhaust gas temperature sensor 158 is disposed downstream from the mixer 56 and in the tailpipe 26. The location of the exhaust gas temperature sensors 150, 152 is selected to measure the exhaust gas temperatures leaving the exhaust manifolds 32, 34. The position of the exhaust gas temperature sensor 154 is selected to measure the temperature of the exhaust gas entering the catalytic converter 40. The position of the exhaust gas temperature sensor 156 is selected to measure the temperature of the exhaust gas entering the mixer 56 and/or leaving the catalytic converter. The position of the exhaust gas temperature sensor 158 is selected to measure the temperature of the exhaust gas leaving the mixer 56.

An engine speed sensor 160 is disposed in or on the engine 22. For example, the engine speed sensor 160 may sense crank position, providing input on the changing positions from which speed of the engine 22, and particularly the angular speed of the crankshaft, may be determined. In some embodiments, the engine speed sensor 160 may be configured to deliver a rotational speed signal for the speed of the engine 22 such as in revolutions-per-minute.

The engine system 20, the control system 120, the exhaust system 24, and the air injection system 130 effect processing of multiple working fluids to accomplish desired results. For example, intake air and fuel are processed through the engine 22 with an air/fuel ratio delivered to the cylinders in closed-loop control, using inputs from the various sensors including those in the exhaust system 24 to make corrections for efficient operation and air/fuel consumption. In addition, the exhaust gas from the engine 22 is efficiently processed through the exhaust system 24 with reaction control provided by the air injection system 130. For example, the two air injectors 132, 134 are located and operated to control where exotherm energy releases occur in the exhaust system 24 with optimal reaction occurring over an advantageously wide range of engine speeds and exhaust mass flow rates without exceeding component temperature limits.

Figure 2:
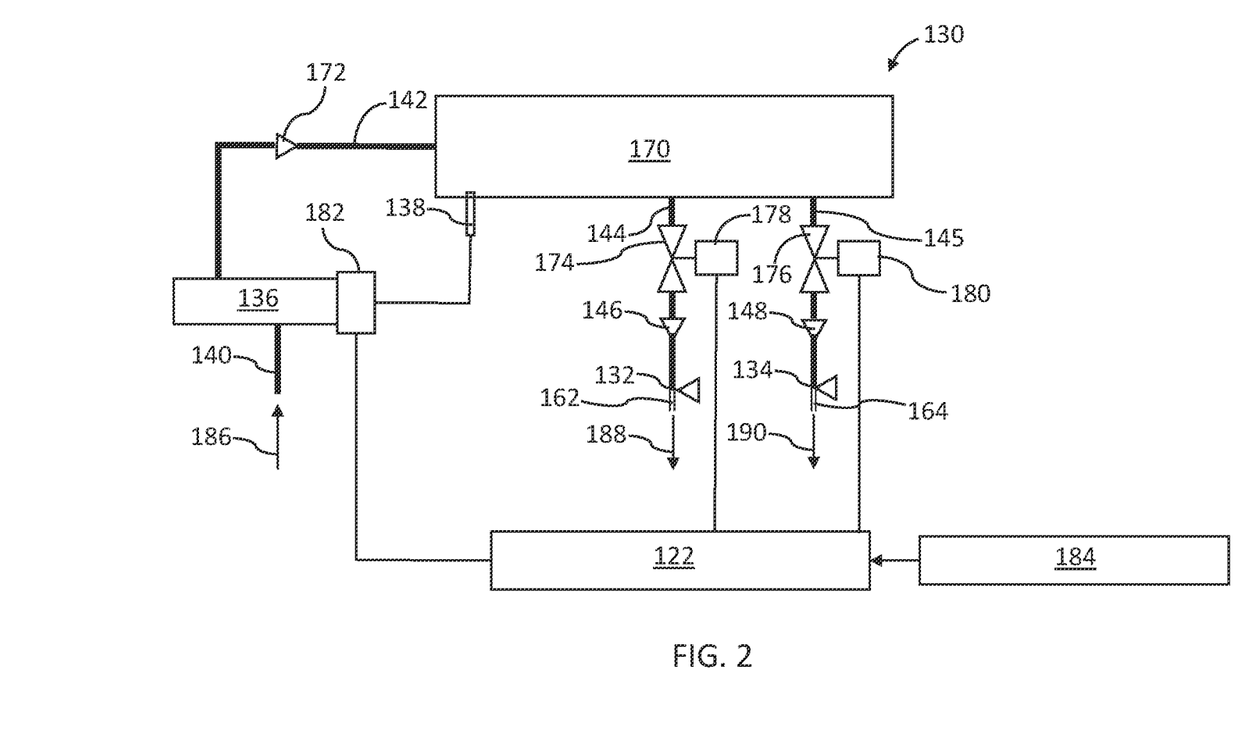
FIG. 2 is a schematic illustration of the air injection system of the engine system of FIG. 1, in accordance with various embodiments.

Referring to FIG. 2, aspects of the air injection system 130 and aspects of the control system 120 are shown schematically. The air injection system 130 includes the pump 136, the air injectors 132, 134 the check valves 146, 148 the pipe sections 140, 142, and the branch pipe sections 144, 145. In this illustration the pipe section 142 is shown as including a buffer tank 170 providing a contained amount of high-pressure air to ensure adequate supply to the air injectors 132, 134 to meet all operational needs. The pressure sensor 138 is disposed in the buffer tank 170 to monitor pressure therein. The Pump 136 is operated to maintain pressure in the buffer tank 170 and a check valve 172 inhibits backflow through the pipe section 142 toward the pump 136. In addition to the check valves 146, 148 and the air injectors 132, 134, the branch pipe sections 144, 145 includes flow control valves 174, 176 to control the amount of flow supplied to the air injectors 132, 134. In some embodiments, the air injectors 132, 134 may themselves have controllable variable orifices obviating the need for the separate flow control valves 174, 176. In some embodiments, rather than including the pump 136, air may be supplied from another available source such as a turbocharger or supercharger of the engine 22.

The control system 120 includes a controller 122, which may be an engine control module for the engine 22. The controller 122 is coupled with mass flow controllers 178, 180 for controlling each of the flow control valves 174, 176, respectively. The controller 122 is also coupled with an air pump controller 182 for controlling the pump 136. The controller 122 is supplied with data from a sensor suite 184, which includes the engine speed sensor 160, the oxygen sensors 124-127, and the exhaust gas temperature sensors 154, 156, 158. The mass flow controllers 178, 180 may be full function controllers configured similar to the controller 122 as described above. In other embodiments, the mass flow controllers 178, 180 may have simplified functionality for operation in conjunction with the controller 122.

In general, the control system 120 and the air injection system 130 operate to draw an air supply 186 into the pump 136, pressurize the supplied air, and supply precise amounts of the air through the air injectors 132, 134 as injected air 188 and injected air 190 into the exhaust system 24. The total air injected may be a combination of one, both or neither of the injected airs 188, 190. In other words, depending on operating conditions, no air may be injected through the air injectors 132, 134, air may be injected through only one of the air injectors 132, 134, or air may be injected through both off the air injectors 132 and 134 at individually determined mass rates.

The air injector 132 located upstream from the catalytic converter 40 may have an injection orifice 162 that is smaller as compared to a larger injection orifice 164 of the air injector 134. In other words, the injection orifice 162 has a first openable flow area, dimensionally smaller than a second openable flow area of the injection orifice 164. The smaller injection orifice 162 may be used for the upstream air injector 132 to improve mixing and provide more accurate air injections. The larger injection orifice 164 may deliver greater flow from downstream air injector 134 to reduce exhaust temperatures if needed. The air injectors 132, 134 may each operate over air flow injection ranges, where the injection orifices 162, 164 are varied in size. Air injection accuracy may be improved for both air injectors 132, 134 by lowering the air flow injection range over which each air injector 132, 134 operates.

Figure 3:
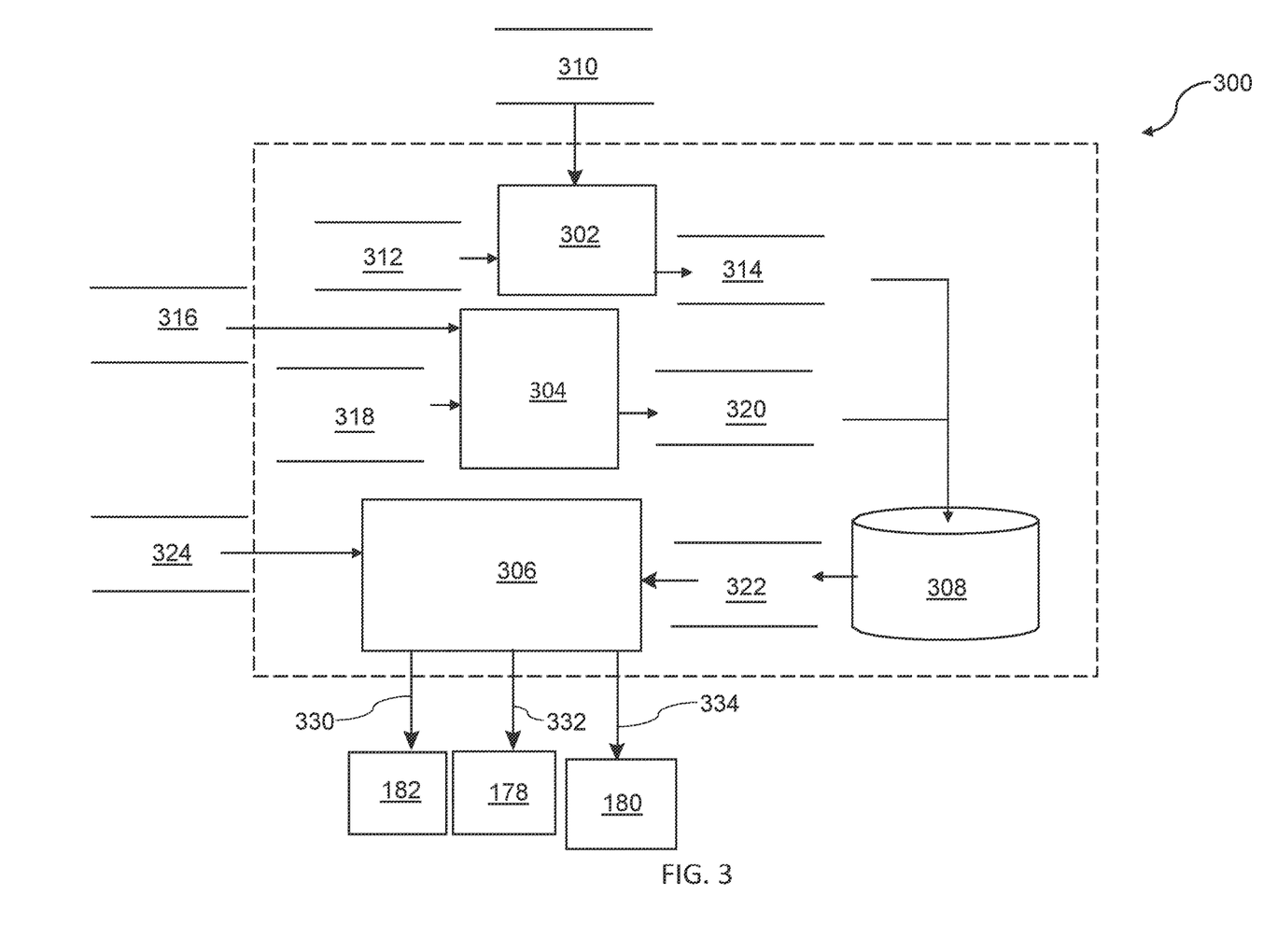
FIG. 3 is a dataflow diagram illustrating control aspects of the air injection system of FIG. 2, in accordance with various embodiments.

Referring to FIG. 3, a part of the control system 120 in operating the air injection system 130 is illustrated and is generally carried out by operation of the relevant hardware by the controller 122 mass flow controllers 178, 180 and is depicted as air injection control system 300. For simplicity, descriptions may refer to one controller, which means one or more controllers. The air injection control system 300 may be configured to include a CO and EQR calculation module 302, a reaction and air injection module 304, an air flow control module 306, and a datastore 308.

Figure 4:
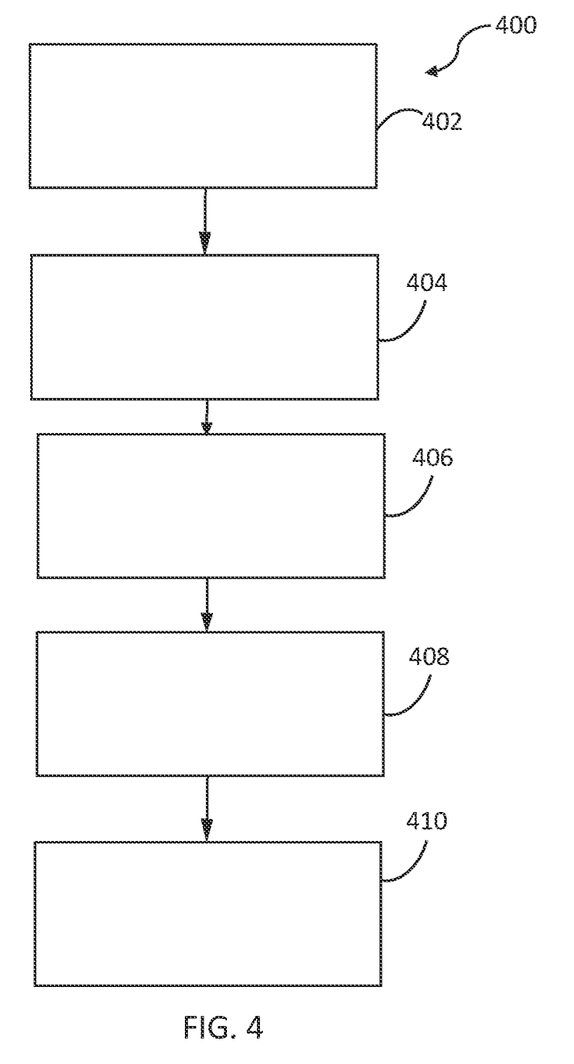
FIG. 4 is a flowchart of a process for implementing the air injection system controlling pre and post catalyst air injection in the exhaust system of the engine system of FIG. 1, in accordance with various embodiments.

Referring to FIG. 4 along with FIG. 3, a process 400 for control of the air injection system 130 is depicted. The process 400 may be run continuously whenever the engine 22 is operating. In embodiments, the process 400 may run only when rich-of-stoichiometric operating conditions of the engine 22 are present. In other embodiments, the process 400 may run whenever excess CO or HC is present in the exhaust gas stream. In general, the CO and EQR calculation module 302 computes 402 the current CO output from the engine 22 and the current EQR. In this embodiment, the CO and EQR calculation module 302, uses sensed data 310 that includes inputs from the mass airflow sensor 90, the oxygen sensors 124-127 and the engine speed sensor 160.

Calculating 402 the CO may employ CO model data 312, such as may be obtained from the datastore 308. A CO model may be constructed using a physics-based approach, a data-driven experiment-based approach, a combination thereof, or through other means. For example, the CO model may be created using commercially available computational software for high-fidelity simulations verified by targeted testing. In some embodiments, the CO model may be simplified and configured with predetermined values, such as using lookup tables where CO levels are tabulated by oxygen content in the exhaust gas to convert the sensed data 310 to CO level. In some embodiments, calculating 402 CO may be conducted using the sensed data 310 from only the oxygen sensors 125, 127 downstream from the close-coupled catalytic converters 36, 38 to have an accurate determination of the exhaust gas conditions approaching the catalytic converter 40.

Calculating 404 the EQR employs EQR data 312 such as may be obtained from the datastore 308 along with exhaust oxygen data from the oxygen sensors 124-127 in the sensed data 310. As noted above, fuel/air ratios may be used rather than the inverse air/fuel ratios. Calculating EQR involves determining current fuel/air ratio using the sensed data 310 from the oxygen sensors 124-127. The stoichiometric fuel/air ratio is generally available from the engine control module of the engine 22 and may be determined using the mass of air (such as from the mass airflow sensor 90) and the mass of fuel entering the engine 22 such as from the fuel system metering through the injectors 106-113. Comparing the current and stoichiometric values provides the EQR.

The reaction and air injection module 304 in general, computes 406 exotherm reaction temperature rises and computes 408 corrected airflows to address the computed 406 exotherm reaction temperature rises. The computed 408 corrected airflows are airflows desired for the injected air 188, 190, as opposed to actual current airflows through the air injectors 132, 134.

Calculating 406 the exotherm reaction temperature rises includes calculating 406 a temperature rise in the catalytic converter 40. The catalytic converter 40 contains a catalyst with a maximum temperature limit to which it is desirably exposed. For example, the maximum temperature limit may be 950 degrees Celsius. In addition, the air injection rates of the air injection system 130 impact the amount of temperature rise in the catalytic converter 40. Accordingly, information on the expected temperature rise in the catalytic converter 40 is useful in determining the level of air injection mass flow rates to employ.

The reaction and air injection module 304 receives the sensed data 316, which includes data from the exhaust gas temperature sensors 154, 156, 158, data from the oxygen sensors 124-127, data from the mass airflow sensor 90, and the current airflow mass rates through the air injectors 132, 134, such as from the mass flow controllers 178, 180. The reaction and air injection module 304 also obtains an exotherm model, an air injection model, and CO rate, such as from the datastore 308.

The exotherm model may be a model of the exhaust system 24 and the air injection system 130 that may be used to determine, based on available mathematics and current sensed parameters, the expected temperature rise in the catalytic converter 40 and optionally in the mixer 56, when included, based on the amount of air injection needed to consume the remaining CO and HC in the exhaust gas stream. The exotherm model may be constructed using a physics-based approach, a data-driven experiment-based approach, a combination thereof, or by other means. For example, the exotherm model may be created using commercially available computational software for high-fidelity simulations with targeted testing. In some embodiments, the exotherm model may be simplified and configured with predetermined values, such as in lookup tables where sensed data values are tabulated to convert the sensed data 316 to expected temperature rises.

The air injection model may be a model of the exhaust system 24 and the air injection system 130 that may be used to determine, based on available mathematics and current sensed parameters, the preferred airflows through the air injectors 132, 134 needed to consume the remaining CO and HC in the exhaust gas stream. The air flow model may be constructed using a physics-based approach, a data-driven experiment-based approach, a combination thereof, or by other means. For example, the air flow model may be created using commercially available computational software for high-fidelity simulations with targeted testing. In some embodiments, the airflow model may be simplified and configured with predetermined values, such as in lookup tables where sensed data values are tabulated to convert the sensed data 316 to preferred airflow values, subject to the expected temperature rises (as further described below).

Calculating 406 the exotherm reaction temperature rises includes processing the sensed data 216 and the CO rate through the exotherm model to obtain values on the expected temperature rise in the catalytic converter 40 and in the mixer 56, when included. Calculating 408 the corrected airflows includes processing the sensed data 216, the CO rate, and the expected temperature rises through the air flow model to obtain desired airflows through the air injectors 132, 134.

The air flow control module 306 receives sensed data 324, the CO rate, and the corrected air flows. The sensed data 324 includes data from the exhaust gas temperature sensors 154, 156, 158, the mass airflow sensor 90 and the engine speed sensor 160. The air flow control module 306 processes the data and transmits a control signal 330 to the air pump controller 182, a control signal 332 to the mass flow controller 178 and a control signal 334 to the mass flow controller 180. As coordinated between the air flow control module 306, the air pump controller 182, the mass flow controller 178 and the mass flow controller 180, the pump speed and the positions of the flow control valves 174, 176 are set to supply the desired amount of air injection through the air injectors 132, 134 to consume the remaining CO, HC and/or PM in the exhaust gas stream.

Under certain operating conditions, reaction of the exhaust gas constituents occurs only in the active catalyst in the catalytic converter 40 and not in the pipe sections approaching and leaving the catalytic converter 40, such as in the pipe sections 42, 45, 46, 47. The exothermic reaction within the catalytic converter 40 releases heat. Under certain operating conditions, the exothermic reaction needed to consume all remaining CO and HC in the exhaust gas stream would raise the catalyst above its maximum temperature limit. Another factor complicating is that the exhaust gas temperature may not be sufficiently high to result in reaction within the pipe sections themselves. For example, with the engine 22 operating at/above 4000 RPM and running rich, the amount of CO and HC produced, if consumed solely in the catalytic converter 40, may result in an excursion above the catalyst's maximum temperature limit. In addition, the amount of air injected through the air injector 132 is limited because excess air delivered to the catalytic converter 40 may raise the catalyst above its maximum temperature limit as a result of increased exothermic reaction rates triggered by the added oxygen. In other words, solely injecting air upstream of the catalytic converter 40 may be limited and therefore inadequate to fully consume the remaining CO and HC in the exhaust gas stream.

Accordingly, the heat rise in the catalytic converter is managed by the air flow control module 306 to limit the exotherm in the catalytic converter 40. In such a case, air may be injected both before and after through the air injectors 132, 134, or when necessary only after the catalytic converter 40 through the air injector 134. At high load conditions of the engine 22, injecting air into the exhaust system 24 in a combined approach of both before and after the catalytic converter 40 through the air injector 132 and/or the air injector 134 ensures the temperature of the catalyst in the catalytic converter 40 is maintained below its maximum temperature limit. Under such conditions, the exhaust gas temperature downstream of the catalytic converter 40 is high enough to complete reaction in the pipe section 47 when air is injected through the air injector 134, and also in the mixer 56, when included. The reaction in the pipe section 47 is initiated due to the air injection therein even without additional catalyst being present based on an adequate temperature of the exhaust gas stream. The controller 122 controls flow through the air injector 132 and through the air injector 134, including to inject air to maintain the catalytic converter 40 below its maximum temperature limit while raising the temperature of the exhaust gas stream downstream from the catalytic converter 40 in the pipe section 47. Reacting in the pipe sections before and/or after the catalytic converter enables consuming higher amounts of CO and HC than may be consumed in the catalytic converter 40 alone, and allows moving reaction location outside the catalytic converter 40 to maintain temperatures below the catalyst's maximum temperature limit.

Using two air injection locations as described controls where the reaction and exotherm energy release occurs enabling effective conversion over a wider operational range of the engine 22 including ranges of engine speeds, fuel rich emissions, and mass flows while protecting components (e.g. the catalyst) from exceeding their maximum temperature limits. High mass flows of CO and HC are converted through reaction by maximizing the amount of exotherm oxidation capability achievable within the exhaust system 24, including with only one main catalytic converter 40 instead of adding a second two-way catalytic converter at extra cost.

The location of the air injector 132 is set as far upstream from the catalytic converter 40 as possible, while still downstream from the close-coupled catalytic converter 38. This allows for more reaction time in the pipe sections 46, 45 and enables better mixing of the injected air with the exhaust gases for a more homogeneous mixture. In some embodiments, an optional mixer 149 may be included for further mixing. The mixer 149 may, for example, be a swirl mixer with internal vanes or a ball shaped mixer. Better mixing also increases efficiency of the reaction within the catalytic converter 40. A further advantage of initiating exotherm in the pipe sections 46, 45 is that the temperature of the exhaust gasses travelling therethrough drops as a result of the reaction, enabling more air injection without exceeding the maximum temperature limit of the catalyst in the catalytic converter 40.

In examples, when the engine 22 is operating to produce high mass flows of exhaust gases with high CO and HC contents but the exhaust gas temperature is not high enough to initiate reaction in the pipe section 47 downstream from the catalytic converter 40, dosing air injection upstream of the catalytic converter through the air injector 132 may be maximized to raise the temperature in and after the catalytic converter 40 to a level high enough to react (post catalyst oxidation), including after the air injector 134, solely based on a sufficiently high exhaust gas temperature without the presence of a catalyst. In embodiments where the catalytic converter 40 is a two-way catalytic converter, the outlet temperature at the exhaust gas temperature sensor 156 may be used to diagnose the conversion performance by calculating the exotherm heat release during the HC and CO conversions, which may be used to correct the air injection quantity.

In embodiments where the catalytic converter 40 is a three-way catalytic converter, the reaction of different contents is optimized. When a three-way catalytic converter is included, there is no need to include a two-way catalytic converter downstream because of the ability to initiate in-pipe conversion, providing beneficial savings.

Figure 5:
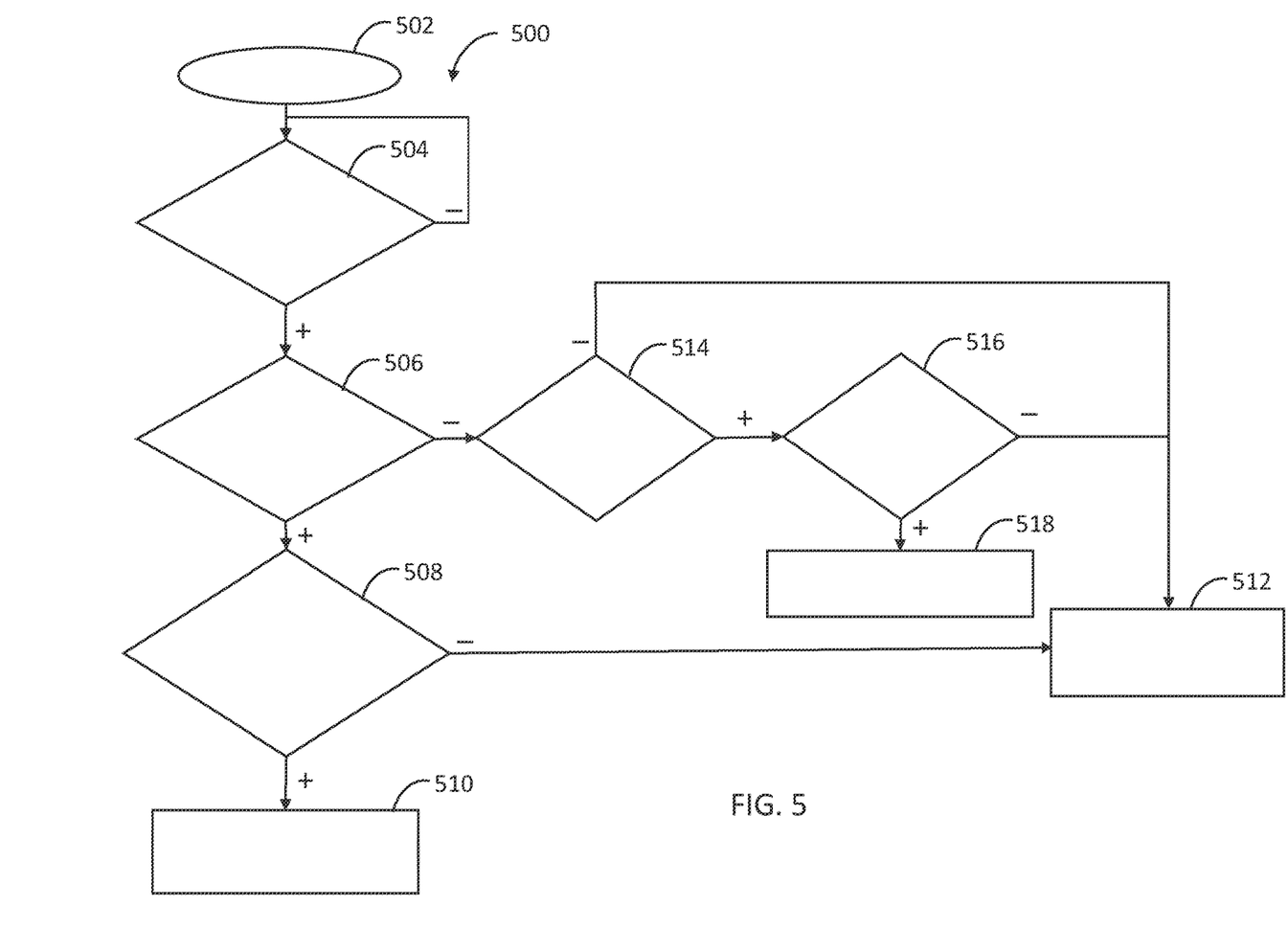
FIG. 5 is a flowchart with details of a part of the process of FIG. 4, in accordance with various embodiments.

Referring to FIG. 5, further details of the functions of the air flow control module 306 are illustrated in process form as injector balancing process 500, which may be carried out in a submodule of the air flow control module 306. The injector balancing process 500 may start 502 whenever the engine 22 is operating and may then run continuously until the engine 22 is shut down. In embodiments, the process 500 may run only when rich-of-stoichiometric operating conditions of the engine 22 are present. In other embodiments, the process 500 may run whenever excess CO or HC is present in the exhaust gas stream.

In the process 500 a determination 504 is made as to whether the EQR is greater than one. An EQR greater than 1.0 is indicative of rich-of-stoichiometric operation of the engine 22. When the determination 504 is positive and the EQR is greater than one, a determination 506 is made as to whether the exhaust gas temperature before the catalytic converter 40 is below a first temperature threshold. For example, the determination 506 may be whether the reading of the exhaust gas temperature sensor 154 is below 800 degrees Celsius. The first temperature threshold of 800 degrees Celsius is set at a level of 150 degrees Celsius below the maximum temperature limit (950 degrees Celsius) of the catalyst in the catalytic converter 40. When the determination 506 is positive, meaning the exhaust gas temperature before the catalytic converter is less than the first temperature threshold, a determination 508 is made as to whether the rotational speed of the engine 22 is below a rotational speed threshold. For example, the determination 508 may be whether the reading of the engine speed sensor 160 is less than 4000 RPM. When the determination is positive, meaning the speed of the engine 22 is less than 4000 RPM, the process 500, and the process 400 proceed to inject 510 air into the exhaust system 24 only through the air injector 132 and no air is injected through the air injector 134. The first temperature threshold is set at 150 degrees Celsius below the catalyst's maximum temperature limit and the engine speed threshold is set at 4000 RPM through characteristic testing which has confirmed that CO and HC are fully converted using air injection solely through the air injector 132 below the thresholds.

Returning to the determination step 504, when the EQR is not greater than one, no air injection is needed and the determination 504 is repeated until the outcome is positive. When the EQR is greater than one at the determination 504 and the exhaust gas temperature before the catalytic converter 40 is above the first temperature threshold at the determination 506, the process 500 proceeds to determination 514. The process 500 determines 514 whether the exhaust gas temperature before the catalytic converter 40 is above a second temperature threshold. For example, the determination 514 may be whether the reading of the exhaust gas temperature sensor 154 is above 850 degrees Celsius. The second temperature threshold of 850 degrees Celsius is set at a level of 100 degrees Celsius below the maximum temperature limit (950 degrees Celsius) of the catalyst in the catalytic converter 40.

When the determination 514 is negative, meaning the exhaust gas temperature before the catalytic converter 40 is between 800 and 850 degrees Celsius (the first and second temperature thresholds), the process 500 proceeds to inject 512 through both the air injectors 132, and 134. When the determination 514 is positive, meaning the exhaust gas temperature before the catalytic converter 40 is higher than the second temperature threshold (e.g. >850° C.), The process 500 proceeds to determine 516 whether the rotational speed of the engine 22 is above the rotational speed threshold. For example, the determination 516 may be whether the reading of the engine speed sensor 160 is more than 4000 RPM. When the determination 516 is negative, meaning the engine speed is not above the threshold (e.g. <4000 RPM), the process 500 proceeds to inject 512 through both the air injectors 132, and 134. When the determination 516 is positive, meaning the engine speed is above the threshold (e.g. >4000 RPM), the process 500 proceeds to inject 518 solely through the air injector 134 and not through the air injector 132. The second temperature threshold and the engine speed threshold are set at 850° C. and 4000 RPM as a result of testing which confirmed that 99 percent of CO and HC in the exhaust gases are reacted and converted through air injection through the air injector 134 only with no air injected through the air injector 132.

In the case of injecting 510 solely through the one air injector 132, after the exhaust gas temperature sensor 156 located after (downstream) from the catalytic converter 40 reaches the maximum temperature limit of the catalyst (e.g. 950° C.), the dosing level at the air injector 132 is fixed and air injection is initiated through the air injector 134 in addition to the through the air injector 132 to achieve the full desired air injection dosing quantity. For operational conditions not covered above, both air injectors 132 and 134 are used to convert all CO and HC in the exhaust gas stream during rich-of-stoichiometric operating conditions of the engine 22 while maintaining the catalyst below its maximum temperature limit (e.g. 950° C.). It should be noted that in normal low load operating conditions of the engine 22, no air injection into the exhaust system 24 is normally needed. The exhaust gas temperature sensor 154 upstream from the catalytic converter 40 assists in controlling air injection through the air injector 132. The exhaust gas temperature sensor 156 downstream from the catalytic converter 40 assists in determining the level of CO and HC conversion and in calculating exotherms. The exhaust gas temperature sensor 158 downstream from the mixer 56 assists is calculating the exotherms in converting CO and HC and calculating the air injection quantities, such as based on EQR and exhaust gas flow rate.

Accordingly, engine systems reduce tailpipe gaseous (hydrocarbon and/or carbon monoxide) emissions and/or particulate matter emissions without exceeding component maximum temperature limits over a wide range of operating conditions. Air is injected through an option of one, two or no air injectors. The two available air injectors are located with one before the underfloor catalytic converter and one after the underfloor catalytic converter.

In embodiments, a temperature sensor before the underfloor catalytic converter is used to control the upstream air injections, and a temperature sensor after the underfloor catalytic converter or downstream mixer may be used to diagnose the conversion performance by calculating the heat release during the combustion. In additional embodiments, a smaller injection orifice may be used for the upstream injector to improve mixing and to deliver more accurate air injection. A larger injection orifice/injection flow for the downstream air injector may be used to reduce exhaust temperatures if needed. When a two-way catalytic converter is used, air injection by the upstream injector when the equivalence ratio is more than 1.0 may be used to control the catalyst temperature and to achieve complete CO and HC reactions if needed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An engine system comprising:
    an engine configured to consume fuel and air to generate an exhaust gas stream;
    an exhaust system configured to channel the exhaust gas stream from the engine to a tailpipe;
    a catalytic converter disposed in the exhaust system;
    a first air injector disposed in the exhaust system upstream from the catalytic converter at a position closer to the engine than to the catalytic converter, the first air injector configured to selectively inject air into the exhaust system upstream from the catalytic converter;
    a second air injector disposed in the exhaust system downstream from the catalytic converter at a position adjacent to a downstream end of the catalytic converter, the second air injector configured to selectively inject air into the exhaust system downstream from the catalytic converter; and
    a controller operatively connected to the first and second air injectors, the controller configured to execute an air injection control configured to:
    inject air only via the first air injector, when a temperature of the exhaust gas stream upstream from the catalytic converter is below a first threshold temperature;
    inject air only via the second air injector when the temperature of the exhaust gas stream upstream from the catalytic converter is above a second threshold temperature that is different than the first threshold temperature; and
    inject air via the first air injector and the second air injector when the temperature of the exhaust gas stream upstream from the catalytic converter is between the first threshold temperature and the second threshold temperature.

2. The engine system of claim 1, comprising:
    a mixer disposed in the exhaust system downstream from the catalytic converter, the mixer defining an oxidation chamber; and
    a mixing plate disposed in the oxidation chamber, wherein the mixing plate is configured to mix the exhaust gas stream as the exhaust gas stream passes through the oxidation chamber.

3. The engine system of claim 1, comprising:
    a first temperature sensor disposed in the exhaust system upstream from the catalytic converter; and
    a second temperature sensor disposed in the exhaust system downstream from the catalytic converter,
    wherein the controller determines the temperature of the exhaust gas stream upstream from the catalytic converter based on a signal from the first temperature sensor, and
    wherein the controller is configured to diagnose a conversion performance of the catalytic converter by calculating a heat released from the catalytic converter based on a signal from the second temperature sensor.

4. The engine system of claim 1, wherein the first air injector defines a first orifice having a first flow area and the second air injector defines a second orifice defining a second flow area,
    wherein the first flow area is less than the second flow area so as to (i) improve mixing and accuracy of the air injected via the first air injector, and (ii) optimize exhaust gas stream temperature reduction caused by the air injected via the second air injector, and
    wherein the air injection control further comprises maintaining a temperature of the catalytic converter below a maximum temperature limit via control of an air flow through at least one of the first air injector and the second air injector.

5. The engine system of claim 1, wherein the controller is configured to
    execute the air injection control when the engine is operating at a rich air/fuel ratio.

6. The engine system of claim 1, wherein the catalytic converter comprises a two-way catalytic converter, and wherein the controller is configured to execute the air injection control when the engine is operating at a rich air/fuel ratio such that a temperature in the catalytic converter is controlled so as to achieve a complete reaction of carbon monoxide and hydrocarbon.

7. The engine system of claim 1, wherein the air injection control further comprises injecting air only via the first air injector when a speed at which the engine is operating is below a threshold engine speed.

8. The engine system of claim 7, wherein the air injection control further comprises injecting air only via the first air injector when the engine is operating at a rich air/fuel ratio, the temperature of the exhaust gas stream upstream from the catalytic converter is below the first threshold temperature, and the engine is operating below the threshold engine speed.

9. A method comprising:
    operating an engine system including an engine configured to consume fuel and air so as to generate an exhaust gas stream;
    channeling the exhaust gas stream from the engine to a tailpipe via an exhaust system;
    arranging a catalytic converter in the exhaust system;
    arranging a first air injector in the exhaust system at a position upstream from the catalytic converter, the first air injector configured to selectively inject air into the exhaust system upstream from the catalytic converter;
    arranging a second air injector in the exhaust system at a position downstream from the catalytic converter, the second air injector configured to selectively inject air into the exhaust system downstream from the catalytic converter; and executing an air injection control via a controller operatively connected to the first air injector and the second air injector, the air injection control comprising:
- injecting air only via the first air injector when a temperature of the exhaust gas stream upstream from the catalytic converter is below a first threshold temperature;
- injecting air only via the second air injector when the temperature of the exhaust gas stream upstream from the catalytic converter is above a second threshold temperature that is different than the first threshold temperature; and
- injecting air via the first air injector and the second air injector when the temperature of the exhaust gas stream upstream from the catalytic converter is between the first threshold temperature and the second threshold temperature.

10. The method of claim 9, comprising
arranging a mixer in the exhaust system at a position downstream from the catalytic converter, the mixer defining an oxidation chamber;
arranging a mixing plate in the oxidation chamber; and
mixing the exhaust gas stream via the mixing plate as the exhaust gas stream passes through the oxidation chamber.

11. The method of claim 9, comprising:
coupling an air injection system with the first air injector and with the second air injector, the air injection system including a first branch pipe section leading to the first air injector, and a second branch pipe section leading to the second air injector;
operatively connecting the controller to the first air injector via a first mass flow controller configured to control air flow through the first air injector; and
operatively connecting the controller to the second air injector via a second mass flow controller configured to control air flow through the second air injector.

12. The method of claim 9, wherein the air injection control further comprises maintaining the catalytic converter below a maximum temperature limit while raising a temperature of the exhaust gas stream downstream from the catalytic converter via control of an air flow through at least one of the first air injector and the second air injector.

13. The method of claim 9, comprising executing the air injection control when the engine is operating at a rich air/fuel ratio.

14. The method of claim 9, comprising:
arranging the catalytic converter as a two-way catalytic converter; and
executing, by the controller, the air injection control when the engine is operating at a rich air/fuel ratio such that a temperature in the catalytic converter is controlled so as to achieve a complete reaction of carbon monoxide and hydrocarbon.

15. The method of claim 9, wherein the air injection control further comprises injecting air only via the first air injector when the engine is operating at a rich air/fuel ratio, the temperature of the exhaust gas stream upstream from the catalytic converter is below the first threshold temperature, and the engine is operating below a threshold engine speed.

16. An engine system comprising:
- an engine configured to consume fuel and air so as to generate an exhaust gas stream;
- an exhaust system configured to channel the exhaust gas stream from the engine to a tailpipe;
- a catalytic converter disposed in the exhaust system;
- a first air injector disposed in the exhaust system upstream from the catalytic converter, the first air injector configured to inject air into the exhaust system upstream from the catalytic converter;
- a second air injector disposed in the exhaust system downstream from the catalytic converter, the second air injector configured to inject air into the exhaust system downstream from the catalytic converter;
- a first exhaust gas temperature sensor disposed in the exhaust gas stream upstream from the catalytic converter, the first exhaust gas temperature sensor configured to detect a first exhaust gas temperature;
- a second exhaust gas temperature sensor disposed in the exhaust gas stream downstream from the catalytic converter, the second exhaust gas temperature sensor configured to detect a second exhaust gas temperature; and
- a controller operatively connected to the first and second air injectors and the first and second exhaust gas temperature sensors, the controller configured to execute an air injection control configured to:
  - inject air only via the first air injector when the detected first exhaust gas temperature is below a first threshold temperature,
  - inject air only via the second air injector when the detected first exhaust gas temperature is above a second threshold temperature that is different than the first threshold temperature, and
  - inject air via the first and second air injectors simultaneously when the detected second exhaust gas temperature is at a maximum temperature limit of the catalytic converter.

* * * * *